(12) United States Patent
Tontiruttananon et al.

(10) Patent No.: US 7,107,061 B1
(45) Date of Patent: Sep. 12, 2006

(54) ADAPTIVE CELL GAPPING OVERLOAD CONTROL SYSTEM AND METHOD FOR A TELECOMMUNICATIONS SYSTEM

(75) Inventors: Channarong Tontiruttananon, Richardson, TX (US); Carlos Molina, Plano, TX (US); Carlos Motta, Richardson, TX (US); Anabella Arosemena, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 370 days.

(21) Appl. No.: 10/184,424

(22) Filed: Jun. 28, 2002

(51) Int. Cl.
*H04Q 7/20* (2006.01)
(52) U.S. Cl. ...................... 455/453; 455/450
(58) Field of Classification Search ............... 455/450, 455/453, 452.1, 509, 452.2, 436, 451, 447, 455/510, 513, 422.1, 464, 62, 63.3; 370/329
See application file for complete search history.

(56) References Cited

U.S. PATENT DOCUMENTS

| | | | | |
|---|---|---|---|---|
| 4,291,377 A | * | 9/1981 | Schneider et al. ............ 702/60 |
| 6,185,428 B1 | * | 2/2001 | Kingdon et al. .......... 455/456.2 |
| 6,208,863 B1 | * | 3/2001 | Salonaho ..................... 455/444 |
| 6,671,512 B1 | * | 12/2003 | Laakso ........................ 455/453 |
| 6,785,546 B1 | * | 8/2004 | Djuric ......................... 455/445 |

OTHER PUBLICATIONS

Arthur W. Berger, "Overload Control Using Rate Control Throttle: Selecting Token Bank Capacity for Robustness to Arrival Rates", IEEE Transactions on Automatic Control, vol. 36, No. 2, Feb. 1991, pp. 216-219.

* cited by examiner

*Primary Examiner*—Eliseo Ramos-Feliciano
(74) *Attorney, Agent, or Firm*—Haynes and Boone, LLP

(57) ABSTRACT

Provided is a system and method for controlling overload in a telecommunications network. The network carries a traffic load that may exceed a maximum resource capacity and drive the network into an overload state. The method determines whether an overload state has occurred by comparing a current resource capacity to an overload onset threshold. If the threshold has been exceeded, the method blocks a certain percentage of traffic. An incrementally increasing percentage of traffic is blocked until the resource capacity crosses an overload abatement level. The method then incrementally decreases the percentage of blocked traffic until no traffic is blocked.

16 Claims, 4 Drawing Sheets

ADAPTIVE CELL GAPPING OVERLOAD CONTROL SYSTEM AND METHOD FOR A TELECOMMUNICATIONS SYSTEM

CROSS-REFERENCE

This application is related to U.S. patent application Ser. No. 10/185,522, filed on (not yet known).

BACKGROUND OF THE INVENTION

The following disclosure relates generally to communications systems and, more particularly, to controlling overload in a telecommunications system.

Telecommunications systems are generally designed to operate with finite resource levels. A resource may be used to service traffic (e.g., voice communications, packet data transmissions, etc.) and may be exhausted if too much traffic is being serviced by the system. Because of limitations such as limited resource levels, the system may successfully service traffic up to a maximum resource level, but the service may start to deteriorate when the maximum level is exceeded and there are insufficient resources available. When this occurs, the system goes into "overload" and, in some situations, may fail entirely.

One or more overload control measures may be implemented in such telecommunication systems in an attempt to regulate or at least minimize the impact of such overload. These control measures generally operate by "throttling" the traffic (e.g., permitting only a portion of the traffic to pass through the system). For example, a percent blocking throttle approach blocks and rejects arriving traffic with a given probability. A call gapping throttle rejects traffic for a certain predefined period of time and then accepts traffic for another predefined period of time (e.g., traffic is allowed through a non-adjustable "gap" that exists when the throttle is open). A token bank throttle uses "tokens" to regulate the traffic by allowing only traffic with a token to pass through the throttle. These measures lessen the level of resource usage and may enable the system to continue to service a smaller amount of traffic.

However, none of these control measures adequately address the complexities presented by traffic patterns in telecommunications systems. For example, none of the above control measures is suitable for handling "mixed" traffic that includes multiple types of messages. Furthermore, some of the measures fail because they are unable to compensate for varying overload onset times. For example, if an overload occurs more rapidly than the control system was designed to handle, the system may fail to control the overload. A further problem is that the previously described control measures are generally designed for a specific overload condition having specific traffic parameters and so are unable to react appropriately when an overload occurs that does not fit within the system's parameters.

Accordingly, what is needed is a system and method for controlling overload that is capable of adapting to various overload conditions.

SUMMARY OF THE INVENTION

In one embodiment, a method for controlling overload in a telecommunications system is provided. The telecommunications system has a limited resource that is used by the system to service traffic. The method makes a first determination as to whether a usage load of the limited resource exceeds an overload threshold, where the overload threshold represents an overload state of the limited resource. The traffic is blocked for a first time interval if the overload threshold has been exceeded. A second determination is made as to whether the usage load continues to exceed the overload threshold. If the usage load continues to exceed the overload threshold, the traffic is blocked for a second time interval that is defined by adding a third time interval to the first time interval. This enables the method to block traffic for an incrementally increasing amount of time to reduce the usage load of the limited resource.

Other aspects and features of the present disclosure will become apparent to those ordinarily skilled in the art upon review of the following description of specific embodiments of the disclosure in conjunction with the accompanying figures.

DETAILED DESCRIPTION OF A PREFERRED EMBODIMENT

Figure 1:
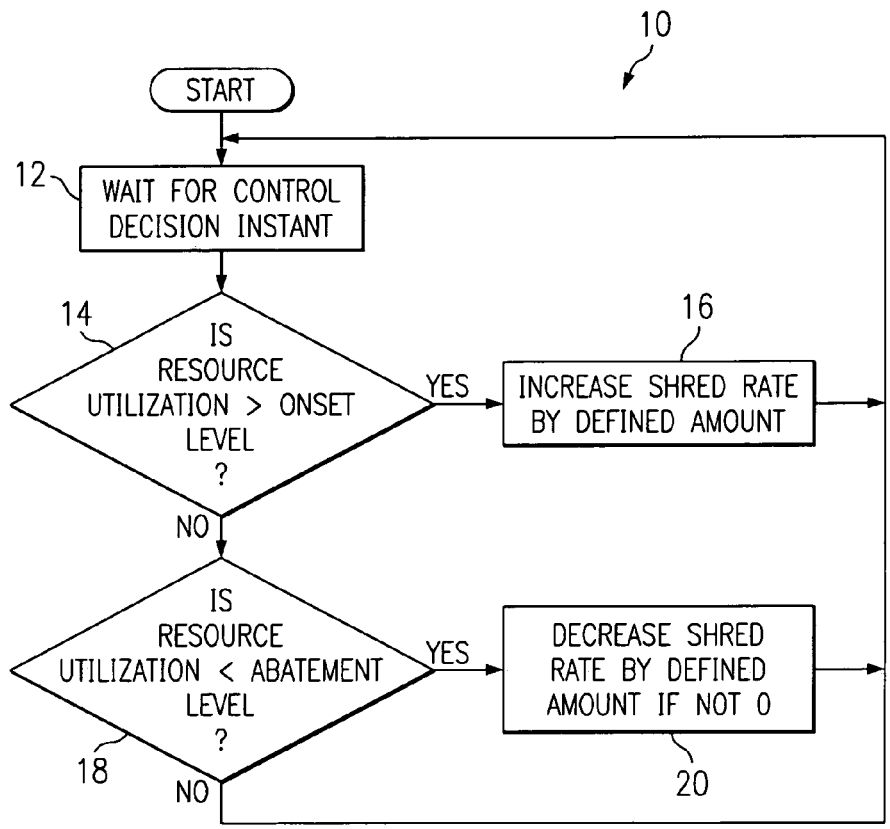
FIG. 1 is a flowchart of a method for controlling overload in a telecommunications system.

The present disclosure relates generally to communications systems and, more particularly, to controlling overload in a telecommunications system. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 is operable to control overload in a telecommunications system by using a number of steps 12–20 to limit traffic flow. Overload may result when the system receives more messages than can be serviced for a sustained period of time. When this occurs, the system may begin to drop packets (in a packetized system) to prevent system failure that may result from unconstrained growth in memory or processing time requirements and corresponding prolonged message processing delays.

Figure 2:
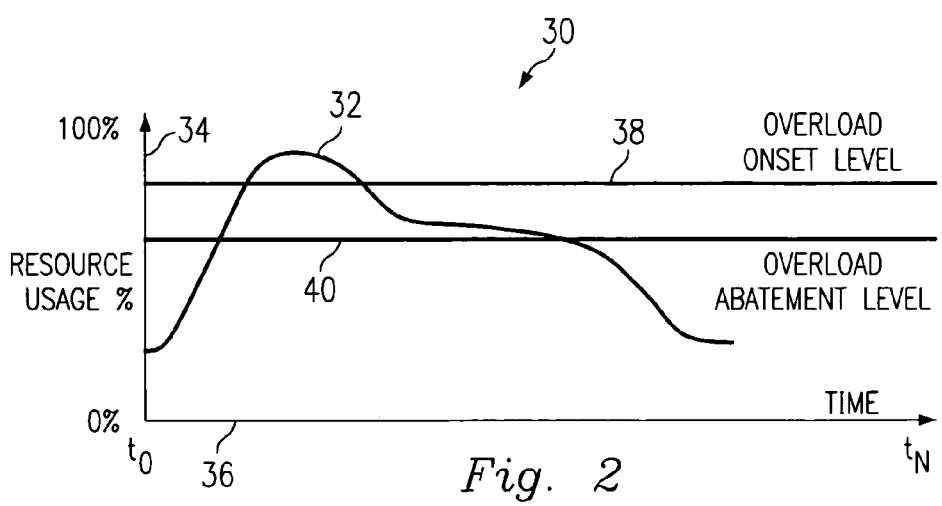
FIG. 2 is a graph illustrating variations in a resource usage load over time.

Accordingly, an overload condition may be detected when the system or a system component begins to run out of resources, as is illustrated in FIG. 2. In a computing environment, these resources may include processing utilization, time (e.g., time to process), bandwidth in packets per second (pps) and/or bits per second (bps), and memory (such as buffer space). For example, some techniques for detecting an overload condition and triggering overload control include: queue delay, which measures message queueing delays to determine when a delay in processing a message exceeds throughput requirements; buffer usage, which monitors the growth in the size of one or more buffers that store messages; memory usage, which monitors usage on a computing node that processes messages; central processing unit (CPU) usage, which monitors the average CPU occupancy on a node that processes messages; call processing occupancy, which monitors the portion of the CPU usage that processes call processing related messages; and message rate, which monitors the incoming message rate at a node.

Referring now to FIG. 2, a graph 30 illustrates a telecommunication system's resource usage load 32 with respect to a y-axis 34 representing a percentage of resource usage and an x-axis 36 representing time. The system includes an overload onset level 38 and an overload abatement level 40. It is noted that there may actually be multiple onset and abatement levels, but only a single onset and abatement level are shown in the present example for purposes of clarity. Each level 38, 40 is defined as a percentage of resource usage.

The onset level 38 corresponds to a level of resource usage where overload is occurring (e.g., overload is occurring when the resource usage load is above the onset level 38). The abatement level 40 corresponds to an upper level of resource usage where overload is not occurring (e.g., overload is not occurring when the resource usage load is less than the abatement level 40). In the area between the onset level 38 and the abatement level 40, overload may be occurring but is under control.

Referring again to FIG. 1 and with continued reference to FIG. 2, the method 10 may control overload by adaptively altering a gap size that is associated with a shred rate. As will be described later in greater detail using specific examples, the shred rate may be used to define a percentage or other metric that determines how many packets (represented by usage load 32) pass through the system and how many are blocked or rejected.

The method 10 begins in step 12 by waiting for a control decision instant. This may be a predefined amount of time between iterations of the method 10, such as once every second. Once the control decision instant occurs, the method 10 continues to step 14 where a determination is made as to whether the usage load 32 exceeds the onset level 38. If the usage load 32 does exceed the onset level 38, overload is occurring and the shred rate is increased in step 16 by increasing the gap size by a predetermined amount, as will be described later in greater detail. The increased gap size blocks more packets, which increases the shred rate and lowers the level of resource usage. The method 10 then returns to step 12 to await the next control decision instant.

If the usage load 32 does not exceed the onset level 38 as determined in step 14, a determination is made in step 18 as to whether the usage load 32 is less than the abatement level 40. If not (e.g., if the usage load is between the onset level 38 and abatement level 40), the gap size remains the same and the method 10 returns to step 12. If the usage load 32 is less than the abatement level 40 and the shred rate is not zero, the shred rate is decreased by reducing the gap size by a predetermined amount and the method 10 returns to step 12. This reduction allows more traffic to be serviced as resources become available. In this manner, the method 10 may enable the system to adapt to different overload occurrences.

Figure 3:
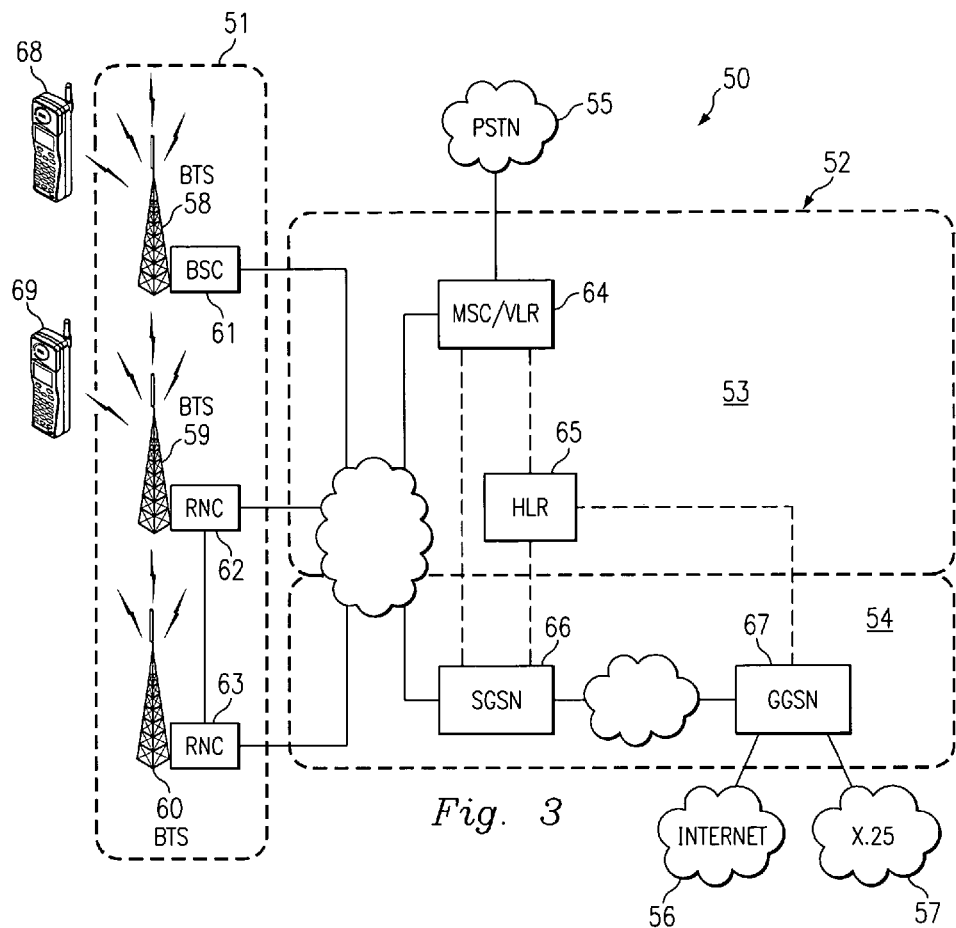
FIG. 3 is a diagram of an exemplary telecommunications network within which overload control may be practiced.

Referring now to FIG. 3, a telecommunications network 50 illustrates a system in which the method described in reference to FIG. 1 may be practiced. In the present example, the network 50 is a wireless network that supports both voice and data packet communications using General Packet Service Radio (GPRS) and Universal Mobile Telecommunications System (UMTS) technologies.

The network 50 comprises a Radio Access Network (RAN) 51 and a core network 52. The core network further comprises a circuit domain 53 and a packet domain 54. Other networks may be accessible to the network 50, such as a Public Switch Telephone Network (PSTN) 55 (connected to the circuit domain 53), Internet 56, and an X.25 network 57 (both connected to the packet domain 54).

The RAN 51 includes a plurality of cells (not shown) serviced by base transceiver stations (BTS) 58, 59, and 60. The BTS 58 is connected to a base station controller (BSC) 61 to provide a second-generation wireless network. The BTSs 59, 60 are accessible to radio network controllers (RNC) 62, 63, respectively, to provide a third-generation wireless network. A mobile switching center/visitor location register (MSC/VLR) 64 may be used to connect the core network 53 with other networks, such as the PSTN 55. A home location register (HLR) 65 may be accessible to the MSC/VLR 64 and also to a serving GPRS support node (SGSN) 66 and a gateway GPRS support node (GGSN) 67 in the packet domain 54.

The network 50 enables at least one mobile device 68 to establish a communication session with another device via the BTS 58. For example, a request to establish a communication session by the mobile device 68 may be directed by the MSC/VLR 64 to (1) a second mobile device 69, (2) a voice terminal (not shown) coupled to the PSTN 55, or (3) a data terminal (not shown) coupled elsewhere to the telecommunications network 50. For example, if the communication session is a circuit data transfer session, the request may be to connect the mobile device 68 to a computer or other data device via the network 50. If the communication is a packet data transfer session, the request may be routed through the SGSN 66, the GGSN 67, and to the Internet 56. It is noted that the mobile devices 68 and 69, while illustrated as mobile telephones, may be any mobile device capable of communicating via the network 50. It is understood that the network 50 is for purposes of illustration and the present disclosure may be equally applicable to other networks.

Figure 4:
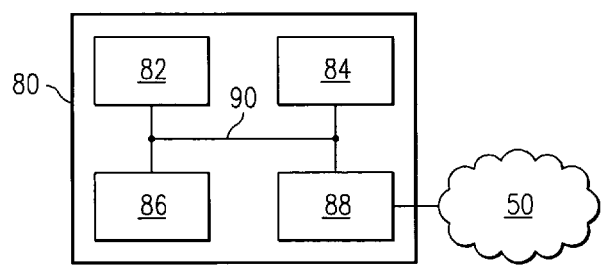
FIG. 4 is a schematic view of a computer that may be used within the network of FIG. 3 to execute the method of FIG. 1.

Referring now to FIG. 4, an exemplary computer 80, such as may be used in the network 50 of FIG. 3, is illustrated. The computer 80 may include a central processing unit ("CPU") 82, a memory unit 84, an input/output ("I/O") device 86, and a network interface 88. The components 82, 84, 86, and 88 are interconnected by a bus system 90. It is understood that the computer may be differently configured and that each of the listed components may actually represent several different components. For example, the CPU 82 may actually represent a multi-processor or a distributed processing system; the memory unit 84 may include different levels of cache memory, main memory, hard disks, and remote storage locations; and the I/O device 86 may include monitors, keyboards, and the like.

The computer 80 may be connected to the network 50 via the network interface 88. Because the computer 80 may be connected to the network 50, certain components may, at times, be shared with other computers (not shown). Therefore, a wide range of flexibility is anticipated in the configuration of the computer. Furthermore, it is understood that, in some implementations, the computer 80 may act as a server to other computers. Accordingly, the method 10 of FIG. 1 may be stored and executed solely on the computer 80 or may be divided among multiple computers and accessible via the network 50. In addition, the network 50 may serve as all or part of the bus system 90 and so the various components 82–88 may be distributed through the network 50.

Figure 5:
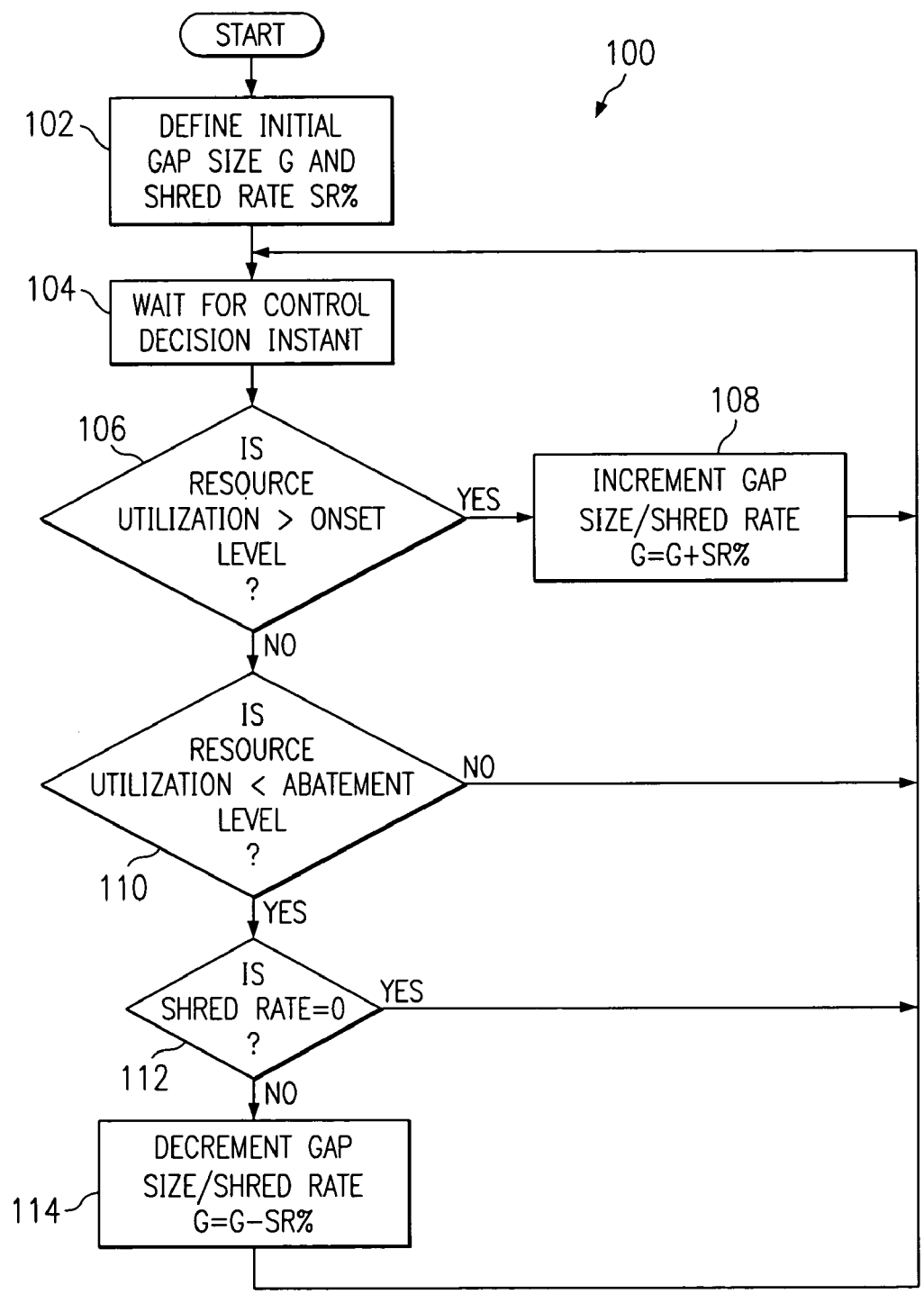
FIG. 5 is a flowchart illustrating a further embodiment of a method for adaptively controlling overload in a telecommunications system.

Referring now to FIG. 5, in another embodiment, a method 100 may control overload in a telecommunications system by using steps 102–114 to adaptively block traffic flow. As previously described, overload may result when more messages are received than can be serviced for a sustained period of time. When this occurs, data packets (in a packetized system) may be dropped to prevent system failure that may result from unconstrained growth of memory or CPU time requirements and corresponding prolonged message processing delays.

Figure 6:
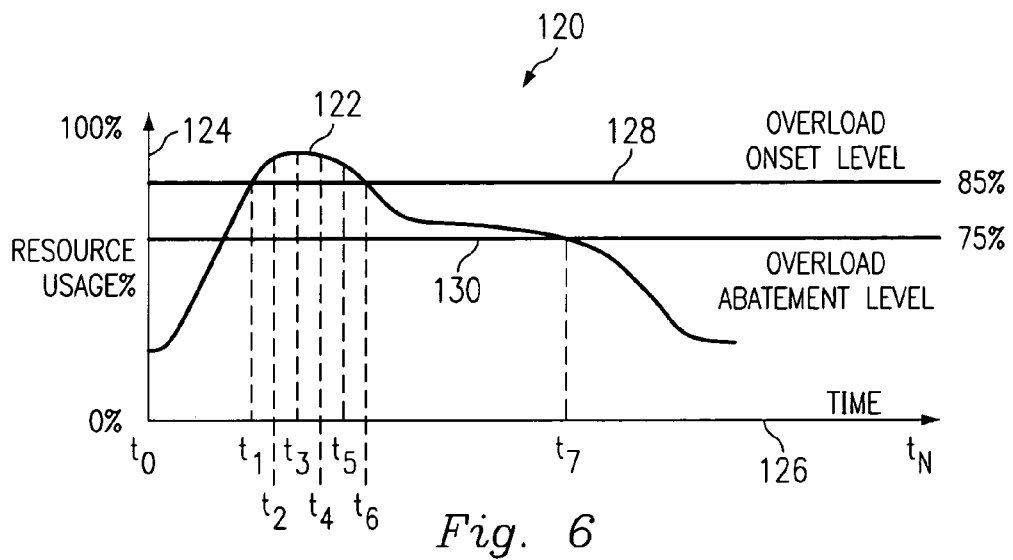
FIG. 6 is a graph illustrating variations in a resource usage load over time in the network of FIG. 3.

Accordingly, an overload condition may be detected when a system or system component begins to run out of resources, as is illustrated in FIG. 6. In a computing environment, the overload may be controlled by adaptively altering a gap size that is associated with a shred rate. The shred rate may be used to define a percentage or other metric that determines how many packets pass through the system and how many are blocked or rejected.

Referring now to FIG. 6, a graph 120 illustrates a telecommunication system's resource usage load 122 with respect to a y-axis 124 representing a percentage of resource usage and an x-axis 126 representing time. The system includes an overload onset level 128 and an overload abatement level 130. It is noted that there may actually be multiple onset and abatement levels, but only a single onset and abatement level are shown in the present example for purposes of clarity.

The onset level 128 corresponds to a level of resource usage where overload is occurring (e.g., overload is occurring at percentages of resource usage above the onset level 128). The abatement level 130 corresponds to an upper level of resource usage where overload is not occurring (e.g., overload is not occurring at percentages of resource usage less than the abatement level 130). In the present example, the onset level 128 is set at 85% and the abatement level 130 is set at 75%. In the area between the onset level 128 and the abatement level 130 (e.g., 75%–85%), any overload is under control.

With the exemplary usage load 122, no overload is occurring from time $t_0$ to time $t_1$. Overload begins at time $t_1$ and is brought under control at time $t_6$. However, the system does not begin reducing its overload control until time $t_7$. It is noted that times $t_0$–$t_7$ do not necessarily represent evenly spaced intervals of time.

Referring again to FIG. 5 and with continued reference to FIG. 6, the method 100 begins in step 102 where an initial gap size and shred rate are defined. For example, the initial gap size may be defined as 0.1 seconds, so that traffic will initially be blocked for 0.1 seconds of each second. Likewise, the shred rate may be defined so that the gap size will be incremented by a certain percentage (e.g., 0.2 seconds).

The method 100 then continues to step 104 and waits for a control decision instant that may be associated with a resource usage sampling interval. The sampling interval should be small enough to enable accurate measurement of variations in the usage load 122, but not so small that excessive resources are consumed by the sampling.

In the present example, the control decision instant of step 104 is based on sampling instances of the usage load 122 with a moving average estimator that uses a pre-calculated smoothing window of length W sampling intervals. An instantaneous mean value at a decision time t may be estimated using an equation such as:

$$\hat{X}_t = \frac{1}{W} \sum_{i=0}^{W-1} X_{t-i} \qquad \text{Eq. 1}$$

In Equation 1, a larger W results in less fluctuation in the estimated mean, but generally takes longer to detect changes in the usage load 122. A smaller W yields an estimate that more closely tracks changes in the usage load 122, but may trigger overload control when no overload is occurring due to either an increase in resource consumption caused by sampling or a spurious high resource usage having a short duration. This may result in oscillation as the system unnecessarily blocks traffic.

Accordingly, the control decision instant of step 104 may coincide with some sampling instances. The time between control decision instances may be larger than the sampling interval, but should be smaller than W to allow a sufficient response time when overload occurs.

Once the control decision instant occurs, the method 100 continues to step 106, where a determination is made as to whether the usage load 122 exceeds the onset level 128. If the usage load 122 does exceed the onset level 128, the shred rate is increased in step 108 by incrementally increasing the gap size as illustrated in FIG. 7.

Figure 7:
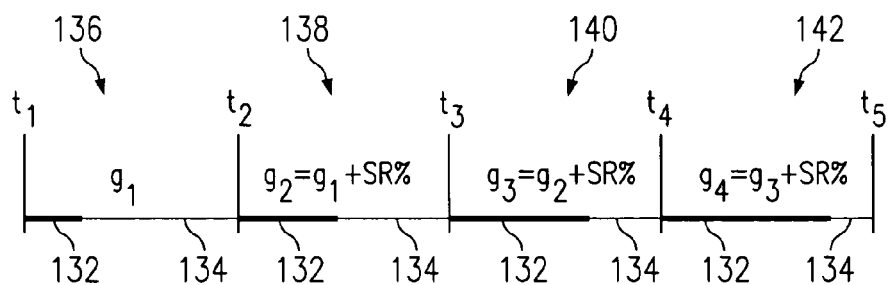
FIG. 7 is an illustration of how the method of FIG. 5 may increase gap size over time to control the resource usage load of FIG. 6.

Referring also to FIG. 7, a gap size 132 represents an amount of time during which traffic is blocked. A time interval 134 illustrates an amount of time where traffic is not blocked (and, together with the gap size 132, represents 100% of time needed for an iteration of method 100). The gap 132 is illustrated with four control periods 136, 138, 140, and 142 (e.g., four iterations of method 100) that occur at control decision instant times $t_1$–$t_4$, respectively.

At time $t_0$, the gap size 132 may be zero, indicating that all traffic is allowed to pass, or may be some higher percentage that blocks traffic for a specified amount of time. When overload is detected at time $t_1$, the gap size 132 is applied to limit the amount of traffic and so control the associated resource usage. At time $t_2$, the gap size 132 is increased by the predefined shred rate percentage. Likewise, the gap size 132 is increased by the same amount at times $t_3$, $t_4$, and $t_5$. For each control decision instant that passes where the usage load 122 remains above the onset level 128, the gap size 132 is increased by adding a percentage of the shred rate to the gap size used during the previous control decision period. Accordingly, the gap size 132 may increase until all traffic is blocked, which will automatically reduce the traffic load to less than the abatement level 130.

Referring again to FIG. 5, if the usage load 122 does not exceed the onset level 128 as determined in 106, a determination is made in step 110 as to whether the usage load 122 is less than the abatement level 130. If not (e.g., if the usage load is between the onset level 128 and abatement level 130), the gap size 132 remains the same and the method 100 returns to step 104. If the usage load 122 is less than the abatement level 130, the method continues to step 112, where the current shred rate is checked. If the shred rate is zero (e.g., no traffic is being blocked), the method returns to step 104. If the shred rate is not zero, the shred rate is decreased by reducing the gap size 132 in step 114 and the method 100 returns to step 104. The reduction may occur by decreasing the gap size 132 incrementally in a manner similar to the incremental increase described with respect to step 108. In this manner, the method 100 enables the system to adapt to different overload occurrences and prevents the possibility of oscillation when the method 100 backs out of overload control after detecting that the usage load 122 is less than the abatement level 130.

While the preceding description shows and describes one or more embodiments, it will be understood by those skilled in the art that various changes in form and detail may be made therein without departing from the spirit and scope of the present disclosure. For example, it is within the scope of the present disclosure that the BTS, the BSC, the RNC, the MSC, the SGSN, the GGSN, and/or the mobile device may not exist in the same fashion in other technologies or implementations, but the same functionality may be achieved using other components. In addition, other methods of obtaining or calculating factors such as predictive control rate adjustment based on one-step or multi-steps ahead resource usage level prediction may be utilized in developing a desired solution. Therefore, the claims should be interpreted in a broad manner, consistent with the present disclosure.

What is claimed is:

1. A method for controlling overload in a telecommunications system having a limited resource, wherein the limited resource is used by the telecommunications system to service traffic, the method comprising:
    making a first determination as to whether a usage load of the limited resource exceeds an overload threshold, wherein the overload threshold represents an overload state of the limited resource;
    blocking all of the traffic for a first time interval if the overload threshold has been exceeded;
    making a second determination as to whether the usage load continues to exceed the overload threshold;
    blocking the traffic for a second time interval if the usage load continues to exceed the overload threshold, wherein the second time interval is defined by adding a third time interval to the first time interval, so that traffic is blocked for an incrementally increasing amount of time to reduce the usage load of the limited resource;
    determining whether the usage load crosses a second threshold, wherein the second threshold represents a non-overload state of the limited resource; and
    reducing an amount of time during which the traffic is blocked if the usage load exceeds the second threshold;
    wherein the reduction occurs at a rate matching the incremental increase.

2. The method of claim 1 wherein making the first and second determinations includes comparing the usage load to the overload threshold.

3. The method of claim 1 wherein blocking the traffic for an incrementally increasing amount of time includes repeatedly adding the third time interval to the second time interval.

4. The method of claim 1 further comprising estimating an instantaneous mean value of the usage load, wherein the mean value is used in determining whether the usage load exceeds the overload threshold.

5. The method of claim 4 wherein the mean value is estimated using a smoothing window of sampling intervals.

6. The method of claim 1 further comprising defining a shred rate for the traffic and defining the first and third time intervals as percentages of the shred rate.

7. The method of claim 1 wherein the limited resource is a processing capacity and wherein the usage load represents a percentage of the processing capacity being used.

8. A method for controlling overload in a telecommunications system operable to service traffic, wherein servicing the traffic consumes a finite resource, and wherein an amount of consumption is represented by a usage load, the method comprising:
    comparing the usage load to an overload threshold;
    incrementally reducing an amount of time during which the traffic is serviced if the usage load is above the overload threshold, wherein the incremental reduction occurs until the usage load is below the overload threshold;
    comparing the usage load to an abatement threshold; and
    incrementally increasing the amount of time during which the traffic is serviced if the usage load is below the abatement threshold;
    wherein incrementally increasing the amount of time during which the traffic is serviced includes repeatedly subtracting the step time interval from the cumulative time interval.

9. The method of claim 8 further comprising defining a cumulative time interval and a step time interval, wherein the incremental reduction includes blocking traffic for the cumulative time interval and repeatedly adding the step time interval to the cumulative time interval.

10. The method of claim 9 further comprising setting the cumulative time interval to a predetermined value before blocking traffic.

11. The method of claim 9 further comprising defining a shred rate, wherein the step time interval is defined as a percentage of the shred rate.

12. The method of claim 8 wherein the amount of time is incrementally increased until no traffic is being blocked.

13. The method of claim 8 wherein the resource is a processing capacity and wherein the usage load represents a percentage of the processing capacity being used.

14. A system for controlling overload in a telecommunications network constrained by a finite resource, wherein the finite resource is used to service traffic, the system comprising:
    a processing means accessible to the network, the processing means having a processing capacity for processing the traffic; and
    a memory for storing computer executable instructions for processing by the processing means, the instructions for:
        comparing a usage load to an overload threshold, wherein the usage load represents an amount of the finite resource being consumed, and wherein the overload threshold represents a predefined overload state of the finite resource;
        incrementally reducing an amount of time during which the traffic is serviced if the usage load is above the overload threshold;
        comparing the usage load to an abatement threshold; and
        incrementally increasing the amount of time during which the traffic is serviced if the usage load is below the abatement threshold;
    wherein the instructions further comprise defining a cumulative time interval and a step time interval, wherein the incremental reduction includes blocking traffic for the cumulative time interval and repeatedly adding the step time interval to the cumulative time interval, and wherein the incremental increase includes repeatedly subtracting the step time interval from the cumulative time interval.

15. The system of claim 14 wherein the instructions further comprise defining a shred rate, wherein the step time interval is defined as a percentage of the shred rate.

16. The system of claim 14 wherein the instructions further include calculating an instantaneous mean value of the usage load, wherein the mean value is used in determining whether the usage load exceeds the overload threshold.

* * * * *